(12) United States Patent
Mital et al.

(10) Patent No.: US 12,734,480 B1
(45) Date of Patent: Sep. 15, 2026

(54) NITROGEN OXIDES WARM UP CONTROL

(71) Applicant: GM Global Technology Operations LLC, Detroit, MI (US)

(72) Inventors: Rahul Mital, Rochester Hills, MI (US); Usman Asad, LaSalle (CA); Layne Lavern Wagner, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 19/269,944

(22) Filed: Jul. 15, 2025

(51) Int. Cl.
*B01D 53/34* (2006.01)
*B01D 53/94* (2006.01)

(52) U.S. Cl.
CPC ....... *B01D 53/346* (2013.01); *B01D 53/9459* (2013.01); *B01D 53/9481* (2013.01); *B01D 2257/404* (2013.01); *B01D 2257/502* (2013.01); *B01D 2257/702* (2013.01); *B01D 2258/01* (2013.01)

(58) Field of Classification Search
CPC .............. B01D 53/346; B01D 53/9459; B01D 53/9481; B01D 2257/404; B01D 2257/502; B01D 2257/702; B01D 2258/01
See application file for complete search history.

(56) References Cited

U.S. PATENT DOCUMENTS 8,776,495 B2 * 7/2014 Gonze .................... F01N 3/103 60/284
11,959,411 B1 4/2024 Mehmood et al.
2015/0135680 A1 * 5/2015 Ancimer ................ F02D 13/06 60/274
2019/0360415 A1 * 11/2019 Romanato ............ F02D 41/405
2019/0368402 A1 * 12/2019 Barrientos Betancourt ............... F01N 3/2013
2024/0218818 A1 * 7/2024 Luo ........................ F01N 3/202

FOREIGN PATENT DOCUMENTS

DE 102015100984 A1 7/2015
DE 102017106766 A1 10/2017
DE 102018111635 A1 11/2018
DE 102018129683 A1 2/2019

* cited by examiner

*Primary Examiner* — Hoang M Nguyen
(74) *Attorney, Agent, or Firm* — Honigman LLP; Matthew H. Szalach

(57) ABSTRACT

A vehicle includes an engine and an aftertreatment system. The aftertreatment system includes a passive nitrogen oxides adsorber (PNA) that stores nitrogen oxides (NOx) below a first release temperature and oxidizes hydrocarbons (HC) and carbon monoxide (CO) above a first light-off temperature an electric heater (EHC), and a selective catalytic reduction (SCR) catalyst. The vehicle includes data processing hardware that performs operations including operating the engine to heat the PNA to a first temperature range that is above the first light-off temperature and below the first release temperature, operating the engine to maintain the PNA within the first temperature range while activating the EHC to heat the SCR catalyst to a second temperature range that is at or above a second light-off temperature, and operating the engine to heat the PNA to a third temperature range that is at or above the first release temperature.

20 Claims, 4 Drawing Sheets

Operating An Engine To Heat A PNA To A First Temperature Range That Is Above A First Light-Off Temperature And Below A First Release Temperature During A First Phase Of A Warm-Up Cycle 602

Operating The Engine To Maintain The PNA Within The First Temperature Range While Activating A EHC To Heat A SCR Catalyst To A Second Temperature Range That Is At Or Above A Second Light-Off Temperature During A Second Phase Of The Warm-Up Cycle 604

Operating The Engine To Heat The PNA To A Third Temperature Range That Is At Or Above The First Release Temperature Subsequent To The SCR Catalyst Reaching The Second Temperature Range And During A Third Phase Of The Warm-Up Cycle 606

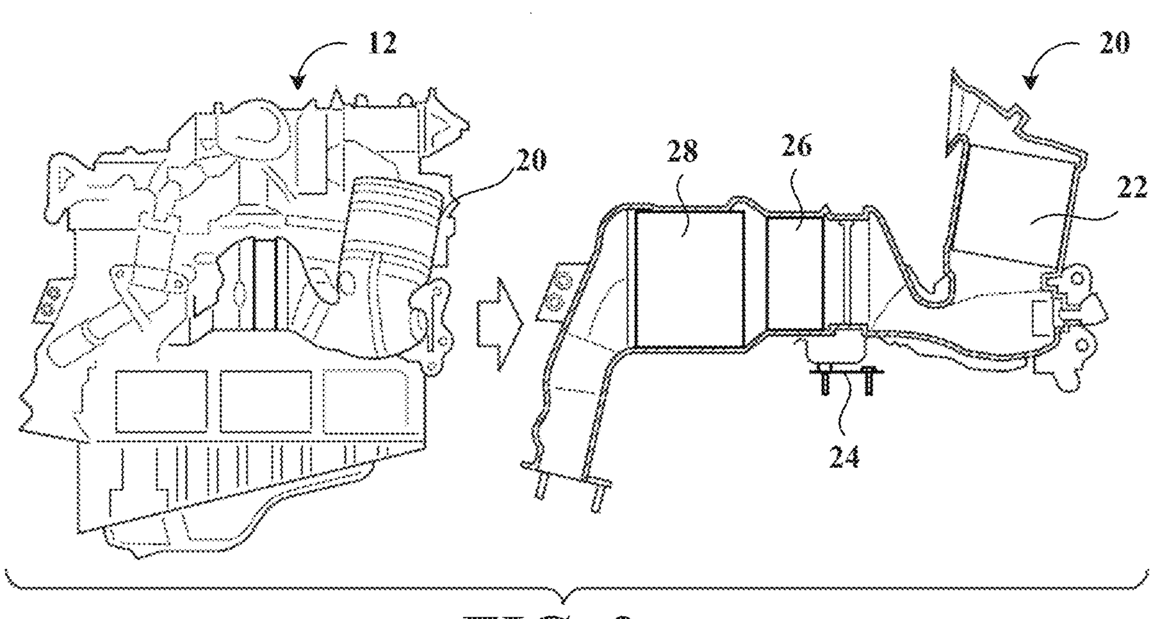

302 Cold Start Operation

304 Initiate PNA Warmup with Post-injection, Retarded Timing and EGR. Activate Electric Heater for SCR.

306 PNA Oxidation Temperature Reached

No

Yes

308 Limit Post Injection and Engine Load to Hold PNA Below 180C while SCR Achieves >225C 310 SCR Target Temperature Reached No Yes 312 Increase Post Injection to Heat up PNA Above 250C 314 PNA Target Temperature Reached No Yes 316 Turn off Electric Heater and End Warm up Strategy

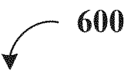

Operating An Engine To Heat A PNA To A First Temperature Range That Is Above A First Light-Off Temperature And Below A First Release Temperature During A First Phase Of A Warm-Up Cycle 602

Operating The Engine To Maintain The PNA Within The First Temperature Range While Activating A EHC To Heat A SCR Catalyst To A Second Temperature Range That Is At Or Above A Second Light-Off Temperature During A Second Phase Of The Warm-Up Cycle 604

Operating The Engine To Heat The PNA To A Third Temperature Range That Is At Or Above The First Release Temperature Subsequent To The SCR Catalyst Reaching The Second Temperature Range And During A Third Phase Of The Warm-Up Cycle 606

FIG. 6

NITROGEN OXIDES WARM UP CONTROL

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to aftertreatment of exhaust gas from internal combustion engines. Exhaust aftertreatment systems may be used to treat the exhaust gas stream produced by an engine before the exhaust gas stream is released into the atmosphere. These systems may include various aftertreatment components whose performance is dependent on the operating temperature of the components. For these components to function effectively, the components may need to be heated from a cold start condition to a minimum operating temperature. In some applications, the engine may be controlled in a manner that increases the temperature of the exhaust gas flowing to the aftertreatment system, which in turn heats the aftertreatment components.

SUMMARY

One aspect of the disclosure provides a vehicle that includes an engine and an aftertreatment system fluidly coupled to the engine to receive an exhaust gas stream from the engine. The aftertreatment system includes a passive nitrogen oxides adsorber (PNA) that stores nitrogen oxides (NOx) below a first release temperature and oxidizes hydrocarbons (HC) and carbon monoxide (CO) above a first light-off temperature. The aftertreatment system includes an electric heater (EHC) positioned downstream of the PNA and a selective catalytic reduction (SCR) catalyst positioned downstream of the EHC. The SCR catalyst reduces NOx above a second light-off temperature. The vehicle includes data processing hardware and memory hardware in communication with the data processing hardware. The memory hardware stores instructions that when executed on the data processing hardware cause the data processing hardware to perform operations. The operations include, during a first phase of a warm-up cycle, operating the engine to heat the PNA to a first temperature range that is above the first light-off temperature and below the first release temperature. The operations include, during a second phase of the warm-up cycle, operating the engine to maintain the PNA within the first temperature range while activating the EHC to heat the SCR catalyst to a second temperature range that is at or above the second light-off temperature. The operations include, during a third phase of the warm-up cycle, subsequent to the SCR catalyst reaching the second temperature range, operating the engine to heat the PNA to a third temperature range that is at or above the first release temperature.

Implementations of the disclosure may include one or more of the following optional features. In some implementations, operating the engine during the first phase of the warm-up cycle includes at least one of a fuel post-injection strategy, a fuel injection timing, or an exhaust gas recirculation (EGR) rate to heat the PNA. Here, operating the engine to maintain the PNA within the first temperature range during the second phase may include minimizing the fuel post-injection strategy relative to the first phase. In some examples, the operations further include receiving a first temperature signal indicating a temperature of the PNA, receiving a second temperature signal indicating a temperature of the SCR catalyst, and controlling the warm-up cycle based on the first temperature signal and the second temperature signal. The operations may further include receiving a NOx signal from a NOx sensor positioned downstream of the PNA and controlling the warm-up cycle further on the NOx signal. In some implementations, first temperature range is approximately 150° C. to 180° C. The first release temperature may be approximately 190° C. The second light-off temperature may be approximately 225° C. In some examples, the operations further include deactivating the EHC during the third phase of the warm-up cycle. The PNA may include a diesel oxidation catalyst (DOC) for oxidizing the HC and the CO.

Another aspect of the disclosure provides a system that includes an engine and an aftertreatment system fluidly coupled to the engine to receive an exhaust gas stream from the engine. The aftertreatment system includes a passive nitrogen oxides adsorber (PNA) that stores nitrogen oxides (NOx) below a first release temperature and oxidizes hydrocarbons (HC) and carbon monoxide (CO) above a first light-off temperature. The aftertreatment system includes an electric heater (EHC) positioned downstream of the PNA and a selective catalytic reduction (SCR) catalyst positioned downstream of the EHC. The SCR catalyst reduces NOx above a second light-off temperature. The system includes data processing hardware and memory hardware in communication with the data processing hardware. The memory hardware stores instructions that when executed on the data processing hardware cause the data processing hardware to perform operations. The operations include, during a first phase of a warm-up cycle, operating the engine to heat the PNA to a first temperature range that is above the first light-off temperature and below the first release temperature. The operations include, during a second phase of the warm-up cycle, operating the engine to maintain the PNA within the first temperature range while activating the EHC to heat the SCR catalyst to a second temperature range that is at or above the second light-off temperature. The operations include, during a third phase of the warm-up cycle, subsequent to the SCR catalyst reaching the second temperature range, operating the engine to heat the PNA to a third temperature range that is at or above the first release temperature.

Implementations of the disclosure may include one or more of the following optional features. In some implementations, operating the engine during the first phase of the warm-up cycle includes at least one of a fuel post-injection strategy, a fuel injection timing, or an exhaust gas recirculation (EGR) rate to heat the PNA. Here, operating the engine to maintain the PNA within the first temperature range during the second phase may include minimizing the fuel post-injection strategy relative to the first phase. In some examples, the operations further include receiving a first temperature signal indicating a temperature of the PNA, receiving a second temperature signal indicating a temperature of the SCR catalyst, and controlling the warm-up cycle based on the first temperature signal and the second temperature signal. The operations may further include receiving a NOx signal from a NOx sensor positioned downstream of the PNA and controlling the warm-up cycle further on the NOx signal. In some implementations, first temperature range is approximately 150° C. to 180° C. The first release temperature may be approximately 190° C. The second light-off temperature may be approximately 225° C. In some examples, the operations further include deactivating the EHC during the third phase of the warm-up cycle. The PNA may include a diesel oxidation catalyst (DOC) for oxidizing the HC and the CO.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

The drawings described herein are for illustrative purposes only of selected configurations and are not intended to limit the scope of the present disclosure.

FIG. 2 is a schematic view of an engine and an aftertreatment system.

FIG. 3 is a flowchart illustrating an example arrangement of operations for a warm-up cycle.

FIG. 6 is a flowchart illustrating an example arrangement of operations for a method of employing a warm-up strategy.

Corresponding reference numerals indicate corresponding parts throughout the drawings.

DETAILED DESCRIPTION

Figure 1:
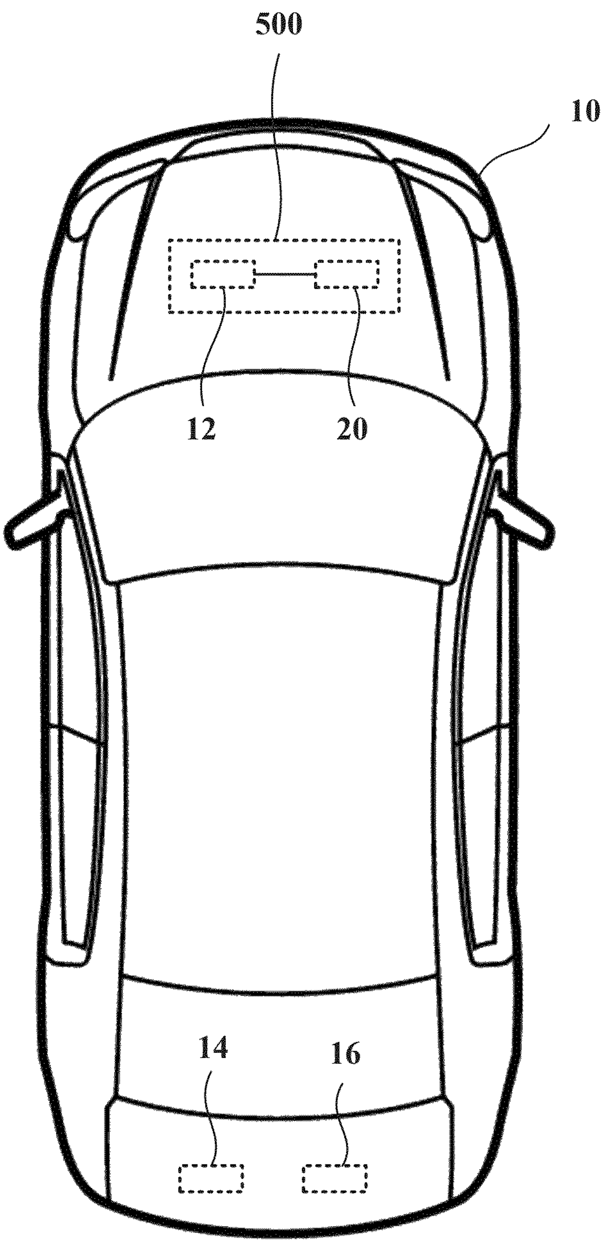
FIG. 1 is a top-down schematic view of a vehicle.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

An internal combustion engine typically produces an exhaust gas stream as a byproduct during operation. The exhaust gas stream is often directed through an aftertreatment system. Such an aftertreatment system may include various components that are configured to convert certain constituents of the exhaust gas into other substances, which may be less harmful to the environment. For example, an aftertreatment system may include a diesel oxidation catalyst (DOC) to facilitate the oxidation of unburned hydrocarbons (HC) and carbon monoxide (CO) present in the exhaust gas. A system of this type may also include a selective catalytic reduction (SCR) catalyst to reduce nitrogen oxides (NOx) into nitrogen and water. Some aftertreatment systems may also incorporate a passive NOx adsorber (PNA). A PNA component is a type of catalyst that is configured to store or adsorb NOx at lower exhaust gas temperatures. In certain configurations, a PNA component may also integrate a DOC function, enabling it to participate in the oxidation of HC and CO in addition to storing NOx.

The catalytic components positioned within an aftertreatment system generally operate effectively once they attain a sufficient operating temperature. The sufficient operating temperature is often referred to as a light-off temperature. For instance, a DOC may become active for oxidation processes at an approximate temperature, for example, of 150° C. Similarly, an SCR catalyst may become active for NOx reduction at an approximate temperature, for example, of 225° C. The task of heating the aftertreatment system, with the aim of achieving catalyst light-off for these various components, typically falls to the engine.

To increase the rate at which the catalysts are heated, a variety of engine-based warm-up strategies may be employed. One such strategy involves injecting additional fuel into the engine cylinders at a later point in the expansion stroke. These injections are commonly referred to as post-injections. A significant portion of the energy derived from this additional fuel contributes to increasing the enthalpy of the exhaust gas flow. Furthermore, the fuel injection timing of the engine may be retarded relative to normal operating values. This adjustment in fuel injection timing may also contribute to an increase in the temperature of the exhaust gas. In some configurations, aftertreatment systems may also include a heating device. Such a heating device may be, for example, an electric heater, which is positioned in the exhaust path. The purpose of this electric heater is to provide additional thermal energy to the aftertreatment system, thereby assisting in the warming of downstream components and accelerating the overall system warm-up process.

Referring now to the drawings, and specifically to FIGS. 1 and 2, a vehicle 10 is shown. The vehicle 10 includes a system 500, which may be understood as an exhaust gas management system. The system 500 includes an engine 12, which generates an exhaust gas stream during operation. The system 500 further includes an aftertreatment system 20, which is fluidly coupled to the engine 12 to receive the exhaust gas stream from the engine 12.

The aftertreatment system 20 is configured to process the exhaust gas stream and includes various components positioned along the exhaust gas flow path. As depicted in FIG. 2, the aftertreatment system 20 includes a passive nitrogen oxides adsorber (PNA) 22. The PNA 22 is structured and formulated to store nitrogen oxides (NOx) when a temperature of the PNA is below a first release temperature. Moreover, the PNA 22 is also configured to oxidize hydrocarbons (HC) and carbon monoxide (CO) when the temperature of the PNA 22 is above a first light-off temperature. Positioned downstream of the PNA 22, the aftertreatment system 20 additionally includes an electric heater (EHC) 24. The EHC 24 is arranged to selectively apply heat to the exhaust gas stream passing through the aftertreatment system 20, particularly for warming downstream components.

Further downstream from the EHC 24, the aftertreatment system 20 includes a selective catalytic reduction (SCR) catalyst 26. The SCR catalyst 26 is configured to reduce NOx when a temperature of the SCR catalyst 26 is at or above a second light-off temperature. The aftertreatment system 20 also includes an SCR filter (SCRf) 28, which is positioned downstream of the SCR catalyst 26. The SCRf 28 may provide particulate matter filtration in addition to SCR functionality. The components 22, 24, 26, and 28 are arranged in series along the exhaust gas path from the engine 12, as illustrated in FIG. 2.

The vehicle 10 additionally includes data processing hardware 14 and memory hardware 16. The memory hardware 16 is in communication with the data processing hardware 14. The memory hardware 16 stores instructions that, when executed on the data processing hardware 14, cause the data processing hardware 14 to perform various operations. The operations are related to controlling the engine 12 and the aftertreatment system 20, particularly for managing the thermal state and emissions performance of these systems. For example, the operations may include executing a warm-up cycle 300 as described further herein with respect to FIG. 3.

FIG. 3 illustrates an example arrangement of operations for a warm-up cycle 300 performed by the data processing hardware 14. The warm-up cycle 300 is configured to bring the various components of the aftertreatment system 20 to their respective operational temperatures, facilitating the reduction of emissions. At operation 302, the data processing hardware 14 initiates a cold start operation. The cold start operation occurs, for example, when the engine 12 has been off for an extended period, allowing the components of the aftertreatment system 20 to cool significantly below their light-off temperatures.

At operation 304, the data processing hardware 14 initiates a warm-up of the PNA 22 during a first phase of the warm-up cycle 300. During the first phase, the data processing hardware 14 operates the engine 12 using one or more engine operating parameters to generate additional heat in the exhaust gas stream directed to the PNA 22. For example, the data processing hardware 14 may implement a fuel post-injection strategy, adjust a fuel injection timing (such as retarding the timing), and/or modify an exhaust gas recirculation (EGR) rate to increase the exhaust gas temperature and flow of thermal energy to heat the PNA 22.

A fuel post-injection strategy involves introducing a quantity of fuel into a cylinder of the engine 12 after a primary combustion event, typically during the expansion stroke. The additional fuel may not fully combust within the cylinder, thereby passing into the exhaust stream. The uncombusted or partially combusted fuel, along with the elevated gas temperature from the combustion of the primary injection, contributes to increasing the enthalpy of the exhaust gas, providing additional thermal energy to the aftertreatment system 20. Adjusting a fuel injection timing, such as retarding the timing, refers to initiating the fuel injection event later in the engine cycle, closer to or after the piston reaches top dead center (TDC) on the compression stroke. Retarding the fuel injection timing may increase the exhaust gas temperature by allowing more heat from combustion to transfer to the exhaust gases rather than being converted into mechanical work. Modifying an exhaust gas recirculation (EGR) rate involves controlling the amount of exhaust gas that is recirculated back into the intake manifold of the engine 12. By adjusting the EGR rate, the combustion characteristics within the engine 12 are altered, which may lead to an increase in exhaust gas temperature. For instance, decreasing the EGR rate may increase in-cylinder temperatures and, consequently, exhaust gas temperatures due to a higher concentration of oxygen in the combustion mixture. These methods, alone or in combination, may be selectively employed by the data processing hardware 14 to provide the necessary thermal energy to heat the PNA 22 to a desired temperature range. As such, this operation heats the PNA 22 to a first temperature range. The first temperature range may be characterized as being above a first light-off temperature for the PNA 22 (e.g., enabling oxidation reactions) and below a first release temperature for the PNA 22 (e.g., to inhibit the release of stored NOx). For example, the first temperature range for the PNA 22 may be approximately 150° C. to 180° C.

At operation 306, the data processing hardware 14 determines whether a PNA oxidation temperature is reached. The data processing hardware 14 makes this determination by receiving a first temperature signal indicating a temperature of the PNA 22, for example, from a temperature sensor positioned proximate to the PNA 22. The PNA oxidation temperature may correspond to the first light-off temperature of the PNA 22, which allows the PNA 22 to oxidize hydrocarbons (HC) and carbon monoxide (CO) present in the exhaust gas stream. When the PNA oxidation temperature is not reached, the data processing hardware 14 may continue or return to operation 304 to further heat the PNA 22 by continuing to adjust the engine operating parameters. When the PNA oxidation temperature is reached, the data processing hardware 14 proceeds to operation 308.

At operation 308, during a second phase of the warm-up cycle 300, the data processing hardware 14 operates the engine 12 to maintain the PNA 22 within the first temperature range. The second phase involves limiting a fuel post-injection strategy, which may include reducing the amount of fuel delivered during a post-injection event, or decreasing the frequency at which these post-injection events occur, relative to the first phase of the warm-up cycle 300. Additionally, the second phase may involve adjusting an engine load. Such an adjustment may include increasing the engine load to generate more heat from primary combustion and reduce the need for exhaust-based heating mechanisms, or decreasing the engine load to reduce the heat transferred to the exhaust system. The purpose of these adjustments is to hold the temperature of the PNA 22 within the first temperature range, thereby inhibiting the release of stored nitrogen oxides to inhibit NOx release from the PNA 22. Concurrently with maintaining the PNA 22 temperature, the data processing hardware 14 activates the EHC 24 to heat the SCR catalyst 26. The EHC 24, positioned downstream of the PNA 22 and upstream of the SCR catalyst 26, rapidly heats the exhaust gas stream to bring the SCR catalyst 26 to a second temperature range. The second temperature range is at or above a second light-off temperature for the SCR catalyst 26, for example, approximately 225° C., enabling efficient NOx reduction. The data processing hardware 14 may receive a second temperature signal, for example, from a temperature sensor positioned proximate to the SCR catalyst 26, to monitor the temperature of the SCR catalyst 26.

At operation 310, the data processing hardware 14 determines whether the SCR catalyst 26 has reached the second temperature range. The data processing hardware 14 may make this determination by evaluating the second temperature signal from the SCR catalyst 26. When the SCR catalyst 26 has not reached the second temperature range, the data processing hardware 14 may continue or return to operation 308 to further heat the SCR catalyst 26 while maintaining the PNA 22 temperature within the first temperature range. When the SCR catalyst 26 has reached the second temperature range, the data processing hardware 14 proceeds to operation 312.

At operation 312, during a third phase of the warm-up cycle 300 and subsequent to the SCR catalyst 26 reaching the second temperature range, the data processing hardware 14 operates the engine 12 to heat the PNA 22 to a third temperature range. The third temperature range is at or above the first release temperature for the PNA 22, which may be above, for example, approximately 250° C. This action facilitates the release of stored NOx from the PNA 22. With the SCR catalyst 26 now active at or above its second light-off temperature, the released NOx may be effectively reduced by the SCR catalyst 26 into nitrogen and water.

At operation 314, the data processing hardware 14 determines whether the PNA target temperature (e.g., within the third temperature range) is reached. The data processing hardware 14 may make this determination by continuously monitoring the PNA temperature via the first temperature signal. When the PNA target temperature is not reached, the data processing hardware 14 may continue or return to operation 310 or 312 to further increase the temperature of the PNA 22. When the PNA target temperature is reached, the data processing hardware 14 proceeds to operation 316. At operation 316, the data processing hardware 14 may deactivate the EHC 24, as the SCR catalyst 26 has already reached the operational temperature. Operation 316 also signals the end of the warm-up strategy 300, as both the PNA 22 and the SCR catalyst 26 have reached the desired operating temperatures for optimal emission control. The data processing hardware 14 may also receive a NOx signal from a NOx sensor, for example, a NOx sensor positioned downstream of the PNA 22, and control the warm-up cycle further based on the NOx signal, such as to determine when to initiate the release of stored NOx from the PNA 22.

Figures 4, 5:
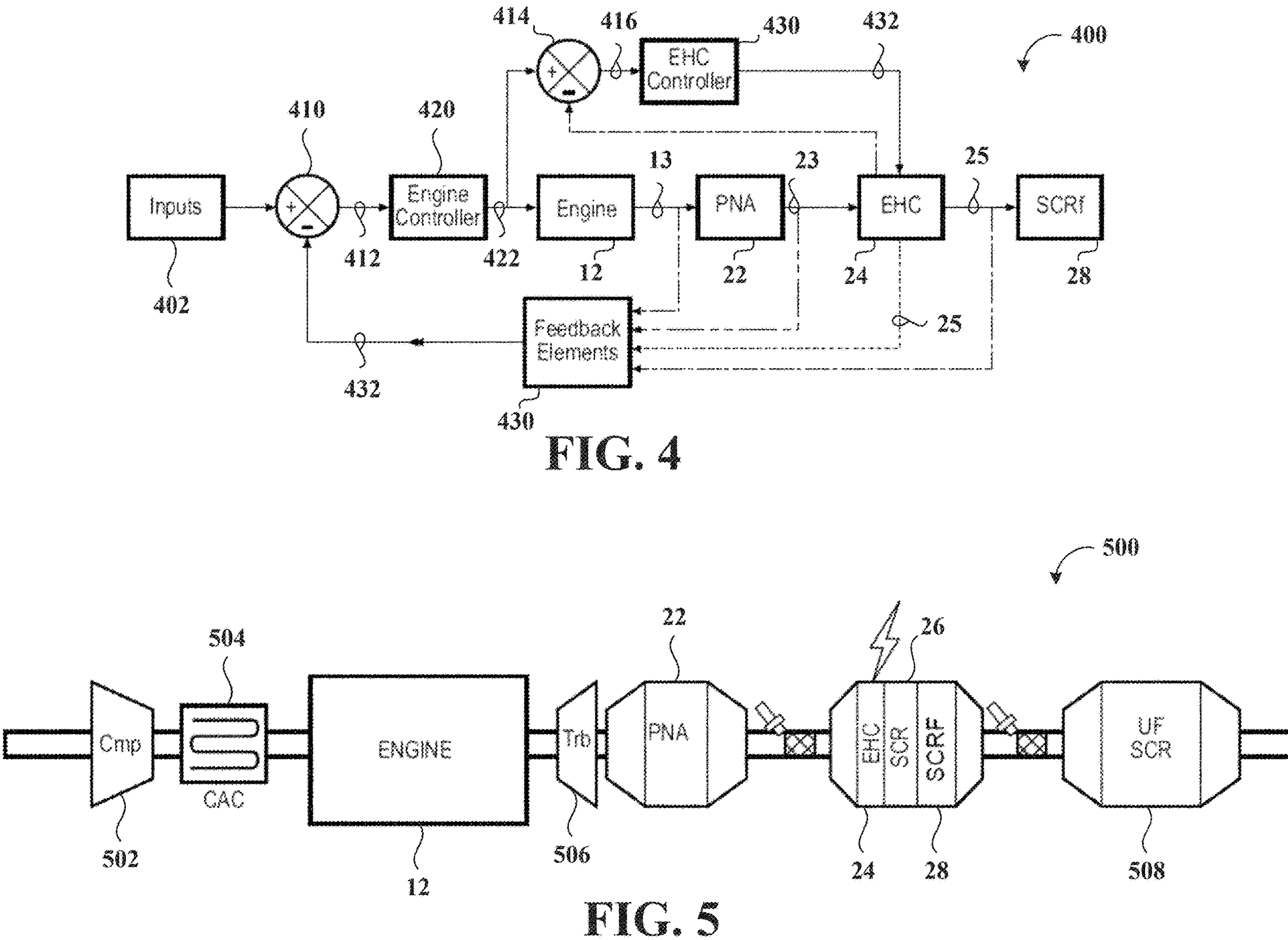
FIG. 4 is a schematic view of a control system.
FIG. 5 is a schematic view of an engine system that includes an aftertreatment system.

FIG. 4 illustrates a schematic view of a control system 400 that facilitates the interaction between various control modules and the engine 12, as well as components of the aftertreatment system 20. The control system 400 may be implemented using the data processing hardware 14 and the memory hardware 16.

A first processing module 410 is configured to receive various input signals 402 and feedback signals 432. The input signals 402 may represent a variety of desired operational parameters for the control system 400. For example, the input signals 402 may specify target temperatures for various aftertreatment components, such as the PNA 22 or the SCR catalyst 26, to facilitate the warm-up. Additionally, the input signals 402 may include desired engine operating points, such as specific engine speed and load targets, which are optimized for rapid thermal management during a warm-up sequence. The feedback signals 432 provide real-time data regarding the current state of the control system 400, enabling the first processing module 410 to make informed adjustments. Based on the received input signals 402 and feedback signals 432, the first processing module 410 generates a first combined output 412. The first processing module 410 may operate by processing the input signals 402 as positive feedback and the feedback signals 432 as negative feedback, thereby implementing a control loop. This configuration allows the first processing module 410 to continuously adjust the first combined output 412 to minimize discrepancies between the desired operational parameters indicated by input signals 402 and the actual performance reflected in feedback signals 432.

An engine control module 420 receives the first combined output 412 from the first processing module 410. In response to the first combined output 412, the engine control module 420 generates an engine control module output 422. The engine control module output 422 may include instructions and parameters designed to modify the operational characteristics of the engine 12. Such modifications may include, but are not limited to, adjustments to fuel injection timing, fuel injection quantity, fuel post-injection strategies, and exhaust gas recirculation (EGR) rates. For example, during a warm-up phase, the engine control module 420 may command a retarded fuel injection timing to increase exhaust gas temperature, or the engine control module may implement a fuel post-injection strategy to introduce uncombusted fuel into the exhaust stream for exothermic reactions in downstream catalysts. These adjustments are specifically tailored to influence the exhaust gas temperature and flow rate, which are important for heating the downstream aftertreatment components, such as the PNA 22 and the SCR catalyst 26.

The engine 12 receives the engine control module output 422. In response to these control signals, the engine 12 adjusts makes adjustments to achieve the commanded parameters. For example, if the engine control module output 422 commands a specific fuel post-injection strategy, the engine 12 adjusts the fuel delivery system accordingly. As a consequence of these operational adjustments, the engine 12 generates an engine output 13. The engine output 13 may include the exhaust gas stream with its specific temperature, flow rate, and composition. The exhaust gas stream is then directed to the aftertreatment system 20 for further processing, including the reduction of various pollutants.

A second processing module 414 is configured to receive the engine control module output 422 and an EHC output 25. The EHC output 25 represents a signal indicating the current state or output of the electric heater (EHC) 24, such as the thermal output or operational status of the ECH 24. Based on these received inputs, the second processing module 414 generates a second combined output 416. The second processing module 414 may generate the second combined output 416 by utilizing the engine control module output 422 as a form of positive feedback and the EHC output 25 as a form of negative feedback. This arrangement allows for coordinated control of engine-based heating and EHC-based heating. For example, if the engine control module output 422 indicates that the engine 12 is contributing a high thermal output to the exhaust gas stream, the second processing module 414 may reduce the commanded power of the EHC 24, as indicated by the EHC output 25, to prevent overheating of downstream components or to conserve electrical power. Conversely, if the EHC output 25 indicates that the EHC 24 is not reaching a desired temperature quickly enough, the second processing module 414 may generate the second combined output 416 to command increased EHC activity to accelerate the warm-up process.

An EHC control module 430 receives the second combined output 416 from the second processing module 414. Based on the second combined output 416, the EHC control module 430 generates an EHC control module output 432. The EHC control module output 432 may include commands and parameters, such as specific electrical current or voltage levels, designed to activate and control the EHC 24. The EHC control module 430 ensures that the EHC 24 operates efficiently and safely, providing the necessary thermal energy to a downstream SCR catalyst 26 while preventing thermal damage to the EHC 24. For example, the EHC control module 430 may modulate the power supplied to the EHC 24 to achieve a specific target temperature for the exhaust gas stream exiting the EHC 24, as measured by a temperature sensor.

The PNA 22, which is a passive nitrogen oxides adsorber that may include an integrated diesel oxidation catalyst function, receives the engine output 13. The engine output 13 includes the exhaust gas stream from the engine 12. As the exhaust gas flows through the PNA 22, the exhaust gas undergoes various chemical reactions and thermal changes. For instance, HC and CO present in the exhaust gas may be oxidized when the PNA 22 is above a first light-off temperature, and NOx can be adsorbed when the PNA 22 is below a first release temperature. The PNA 22 generates a PNA output 23, which represents the exhaust gas stream that has passed through the PNA 22. The PNA output 23 may have reduced levels of HC and CO due to oxidation, and include stored nitrogen oxides.

The EHC 24, positioned downstream of the PNA 22, receives the PNA output 23, which is the exhaust gas stream from the PNA 22. Additionally, the EHC 24 receives the EHC control module output 432, which includes the control signals from the EHC control module 430. In response to these control signals, the EHC 24 actively heats the exhaust gas stream, transferring thermal energy to increase its temperature. This heated exhaust gas stream, now significantly warmer, constitutes an EHC output 25. The primary purpose of the EHC 24 is to rapidly heat the downstream SCR catalyst 26 to the second light-off temperature, which enables efficient NOx reduction. The EHC 24 may, for example, rapidly increase the exhaust gas temperature by several tens or even hundreds of degrees Celsius within a short period to accelerate the activation of the SCR catalyst 26.

The SCR catalyst 26 receives the EHC output 25, which is the heated exhaust gas stream from the EHC 24. When the SCR catalyst 26 is at or above its second light-off temperature, the SCR catalyst 26 efficiently reduces NOx into harmless nitrogen and water through catalytic reactions, typically in the presence of a reductant such as urea or ammonia. A feedback element 430 is configured to receive and process multiple signals from various points within the control system 400. Specifically, the feedback element 430 may receive the engine output 13 (e.g., representing the exhaust gas from the engine 12, potentially including temperature or flow rate), the PNA output 23 (e.g., representing the exhaust gas from the PNA 22, which may include temperature or species concentration), and the EHC output 25 (e.g., representing the heated exhaust gas from the EHC 24, including its temperature). Based on these received inputs, the feedback element 430 generates feedback signals 432. The feedback signals 432 include signals indicative of component temperatures (e.g., EGT1 for the PNA 22, EGT2 for the SCR catalyst 26), exhaust gas composition (e.g., NOx levels detected by a NOx sensor positioned downstream of the SCR catalyst 26), or other relevant operational parameters. The comprehensive feedback 432 is then provided to the first processing module 410, closing the control loop and allowing the control system 400 to continuously monitor and adjust the engine 12 and EHC 24 operations to achieve the desired aftertreatment system warm-up and emission reduction goals. For example, the feedback element 430 may include multiple temperature sensors placed at strategic locations, and a NOx sensor downstream of the SCR catalyst 26 to verify the effectiveness of the NOx reduction.

FIG. 5 illustrates a system 500 that may be understood as an overall engine and exhaust gas aftertreatment system. The system 500 includes the engine 12 which is configured to produce an exhaust gas stream during operation. The system 500 also includes a turbocharger 506, which may be coupled to the engine 12. The turbocharger 506 may include a turbine and a compressor. For example, an exhaust gas stream from the engine 12 drives a turbine portion of the turbocharger 506. The system 500 may further include a charge air cooler (CAC) 504 positioned downstream of a compressor 502 to cool the compressed intake air before the intake air enters the engine 12.

The system 500 further includes various components of an aftertreatment system 20, which are configured to treat the exhaust gas stream from the engine 12. The aftertreatment components may be arranged in a serial flow path. For example, the system 500 includes the PNA configured to adsorb NOx under certain temperature conditions and facilitate the oxidation of HFC and CO. Positioned downstream of the PNA 22, the system 500 includes the EHC arranged to selectively provide thermal energy to the exhaust gas stream. Further downstream from the EHC 24, the system 500 includes the SCR catalyst 26. The SCR catalyst 26 is configured to reduce NOx into less harmful substances. Additionally, the system 500 may include the SCRf, which may be positioned downstream of the SCR catalyst 26 or integrated with the SCR catalyst 26, to provide particulate matter filtration in addition to SCR functionality. A portion of the exhaust system may be configured as an underfloor selective catalytic reduction (UF SCR) catalyst 508, which may be located further downstream in the exhaust path. The arrangement of these components enables the system 500 to manage various emissions from the engine 12.

FIG. 6 illustrates an example arrangement of operations for a method 600 of employing the warm-up strategy 300. FIG. 6 may be described with reference to FIGS. 1-5. The method 600 may execute on the data processing hardware 15. At operation 602, the method 600 includes operating the engine 12 to heat the PNA 22 to a first temperature range that is above a first light-off temperature and below a first release temperature during a first phase of the warm-up cycle 300. At operation 604, the method 600 includes operating the engine to maintain the PNA 22 within the first temperature range while activating the EHC 24 to heat the SCR catalyst 26 to a second temperature during a second phase of the warm-up cycle 300. At operation 606, the method 600 includes operating the engine 12 to heat the PNA 22 to a third temperature range that is at or above the first release temperature subsequent to the SCR catalyst 26 reaching the second temperature range and during a third phase of the warm-up cycle.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A vehicle comprising:
- an engine;
- an aftertreatment system fluidly coupled to the engine to receive an exhaust gas stream from the engine, the aftertreatment system comprising:
  - a passive nitrogen oxides adsorber (PNA) that stores nitrogen oxides (NOx) below a first release temperature and oxidizes hydrocarbons (HC) and carbon monoxide (CO) above a first light-off temperature;
  - an electric heater (EHC) positioned downstream of the PNA; and
  - a selective catalytic reduction (SCR) catalyst positioned downstream of the EHC, the SCR catalyst configured to reduce NOx above a second light-off temperature;
- data processing hardware; and
- memory hardware in communication with the data processing hardware, the memory hardware storing instructions that when executed on the data processing hardware cause the data processing hardware to perform operations comprising:
  - during a first phase of a warm-up cycle, operating the engine to heat the PNA to a first temperature range that is above the first light-off temperature and below the first release temperature;
  - during a second phase of the warm-up cycle, operating the engine to maintain the PNA within the first temperature range while activating the EHC to heat the SCR catalyst to a second temperature range that is at or above the second light-off temperature; and
  - during a third phase of the warm-up cycle, subsequent to the SCR catalyst reaching the second temperature range, operating the engine to heat the PNA to a third temperature range that is at or above the first release temperature.

2. The vehicle of claim 1, wherein operating the engine during the first phase of the warm-up cycle comprises adjusting at least one of:
- a fuel post-injection strategy;
- a fuel injection timing; or
- an exhaust gas recirculation (EGR) rate to heat the PNA.

3. The vehicle of claim 2, wherein operating the engine to maintain the PNA within the first temperature range during the second phase comprises minimizing the fuel delivered during a post-injection event relative to the first phase.

4. The vehicle of claim 1, wherein the operations further comprise:
- receiving a first temperature signal indicating a temperature of the PNA;
- receiving a second temperature signal indicating a temperature of the SCR catalyst; and
- controlling the warm-up cycle based on the first temperature signal and the second temperature signal.

5. The vehicle of claim 1, wherein the operations further comprise:
- receiving a NOx signal from a NOx sensor positioned downstream of the PNA; and
- controlling the warm-up cycle based on the NOx signal.

6. The vehicle of claim 1, wherein the first temperature range is approximately 150° C. to 180° C.

7. The vehicle of claim 1, wherein the first release temperature is approximately 190° C.

8. The vehicle of claim 1, wherein the second light-off temperature is approximately 225° C.

9. The vehicle of claim 1, wherein the operations further comprise, during the third phase of the warm-up cycle, deactivating the EHC.

10. The vehicle of claim 1, wherein the PNA comprises a diesel oxidation catalyst (DOC) for oxidizing the HC and the CO.

11. A system comprising:
- an engine;
- an aftertreatment system fluidly coupled to the engine to receive an exhaust gas stream from the engine, the aftertreatment system comprising:
  - a passive nitrogen oxides adsorber (PNA) that stores nitrogen oxides (NOx) below a first release temperature and oxidizes hydrocarbons (HC) and carbon monoxide (CO) above a first light-off temperature;
  - an electric heater (EHC) positioned downstream of the PNA; and
  - a selective catalytic reduction (SCR) catalyst positioned downstream of the EHC, the SCR catalyst configured to reduce NOx above a second light-off temperature;
- data processing hardware; and
- memory hardware in communication with the data processing hardware, the memory hardware storing instructions that when executed on the data processing hardware cause the data processing hardware to perform operations comprising:
  - during a first phase of a warm-up cycle, operating the engine to heat the PNA to a first temperature range that is above the first light-off temperature and below the first release temperature;
  - during a second phase of the warm-up cycle, operating the engine to maintain the PNA within the first temperature range while activating the EHC to heat the SCR catalyst to a second temperature range that is at or above the second light-off temperature; and
  - during a third phase of the warm-up cycle, subsequent to the SCR catalyst reaching the second temperature range, operating the engine to heat the PNA to a third temperature range that is at or above the first release temperature.

12. The system of claim 11, wherein operating the engine during the first phase of the warm-up cycle comprises adjusting at least one of:

a fuel post-injection strategy;

a fuel injection timing; or an exhaust gas recirculation (EGR) rate to heat the PNA.

13. The system of claim 12, wherein operating the engine to maintain the PNA within the first temperature range during the second phase comprises minimizing the fuel delivered during a post-injection event relative to the first phase.

14. The system of claim 11, wherein the operations further comprise:

receiving a first temperature signal indicating a temperature of the PNA;

receiving a second temperature signal indicating a temperature of the SCR catalyst; and controlling the warm-up cycle based on the first temperature signal and the second temperature signal.

15. The system of claim 11, wherein the operations further comprise:

receiving a NOx signal from a NOx sensor positioned downstream of the PNA; and controlling the warm-up cycle based on the NOx signal.

16. The system of claim 11, wherein the first temperature range is approximately 150° C. to 180° C.

17. The system of claim 11, wherein the first release temperature is approximately 190° C.

18. The system of claim 11, wherein the second light-off temperature is approximately 225° C.

19. The system of claim 11, wherein the operations further comprise, during the third phase of the warm-up cycle, deactivating the EHC.

20. The system of claim 11, wherein the PNA comprises a diesel oxidation catalyst (DOC) for oxidizing the HC and the CO.

* * * * *